United States Patent [19]
Regipa

[11] 3,858,778
[45] Jan. 7, 1975

[54] DEVICE FOR LOCATING THE EDGES OF A FLEXIBLE FILM

[75] Inventor: Robert Regipa, Toulouse, France

[73] Assignee: Centre National D'Etudes Spatiales, Paris, France

[22] Filed: Mar. 18, 1974

[21] Appl. No.: 452,193

[52] U.S. Cl.................. 226/180, 226/196, 271/251
[51] Int. Cl............................................. B65h 23/32
[58] Field of Search .......... 226/196, 198, 199, 180; 271/250, 251

[56] References Cited
UNITED STATES PATENTS
3,561,659  2/1971  Anthony............................ 226/180
3,779,443  12/1973  Regipa............................... 226/199

*Primary Examiner*—Richard A. Schacher

[57] ABSTRACT

A device for locating at least one edge of a flexible film and designed to present the film in a specific position and in a natural state of tension with no appreciable elongation. The device comprises a plate against which the edge rests, a pair of rollers adapted to grip the film resiliently and to keep it against the plate and stiffening plates 4 and 5 which are curved for the purpose of increasing the moment of inertia of the film in the locating area. The device may be used in the manufacture of balloons of synthetic material made from flexible films.

4 Claims, 3 Drawing Figures

PATENTED JAN 7 1975  3,858,778

DEVICE FOR LOCATING THE EDGES OF A FLEXIBLE FILM

FIELD OF THE INVENTION

The invention relates to an improved locating device whereby a perfectly defined location may be imparted to the edge of a flexible film adapted to be continuously displaced under the action of drive means, for the purpose of being subjected to a specific operation.

BACKGROUND OF THE INVENTION

U.S. Pat. No. 3,779,443 describes a locating device used for the purpose of locating, in a satisfactory manner and without appreciable stretching, films having a high modulus of elasticity. This device comprises two guide elements with surfaces facing each other, between which the film travels, a locating area guiding the edge of the film, and rollers which grip the edge of the film, causing it to bear against the locating area. The rollers are designed, on the one hand, so that the guiding force provided is very small during normal operation and, on the other hand, so that in the event of any accidental lateral stress, they apply to the film a wedging action which increases with the amount of accidental lateral stress in order to compensate this stress.

In the case of films having a high modulus of elasticity, however, the guide elements must define, between their faces, a passage scarcely greater in width than the thickness of the film, since if the passage is substantially wider than the thickness of the film, the latter, by reason of its considerable elasticity, tends to curve and rest against the locating area, resulting in incorrect location of the film. This limitation obliges the user to adapt the locating device to the thickness of the film for which it is designed: this is inconvenient, since for one thing the films to be processed vary greatly in thickness and, for another, variations in thickness may even occur in the same film.

STATEMENT OF THE INVENTION

It is the purpose of this invention to provide a locating device having all of the advantages of the device described in the above-mentioned U.S. patent and, furthermore, making it possible to locate films having a high modulus of elasticity and a wide range of thicknesses.

It is also the purpose of this invention to provide a device with an improved performance in the matter of locating the edges of a film having a very high modulus of elasticity, for example an extremely thin film or a hot film (modulus of elasticity is to be understood to mean the ratio between the elongation of the film and the stress producing this elongation).

The device of the present invention comprises for each edge of the film to be located:

two adjacent guide elements consisting of two guiding surfaces facing each other between which the edge of the film is required to travel;

stop means provided with a locating area, parallel with the direction of travel of the film, on which the edge of the film, guided by the aforesaid surfaces, is adapted to bear and slide;

at least one pair of rollers, arranged symmetrically on each side of the guide elements and provided with flexible skirts between which the edge of the film is adapted to be resiliently gripped, the plane of rotation of the rollers being at a slight angle to the locating area, in a manner such that the skirts of the rollers apply to the film, as it passes, forces directed towards the locating area and tending to apply the edge of the film thereagainst.

According to the invention, the opposing guiding surfaces, between which the edge of the film is required to travel, are curved surfaces, parallel with each other, and spaced apart by a distance at least equal to the greatest thickness of the film in the range under consideration; the curvature of the surfaces is such that the lines of maximal curvature are located in planes parallel with the locating area of the device.

Thus, the part of the film bearing on the locating area is guided by the above-mentioned surfaces in such a manner that it exhibits a curved profile, which substantially increases its moment of inertia and prevents the forming of a fold, in the vicinity of the locating area, as a result of pressure on this area. Thus, the film does not have to be as tightly guided as a flat film, and the guiding surfaces may be separated by a distance substantially greater than the thickness of the film, with no risk of folds and faulty location.

BRIEF DESCRIPTION OF THE DRAWINGS

The invention is explained hereinafter in greater detail with the aid of the drawing attached hereto which provides, by way of non-restrictive example, a form of execution of the invention. In the drawing.

DESCRIPTION OF PREFERRED EMBODIMENT

Figure 1:
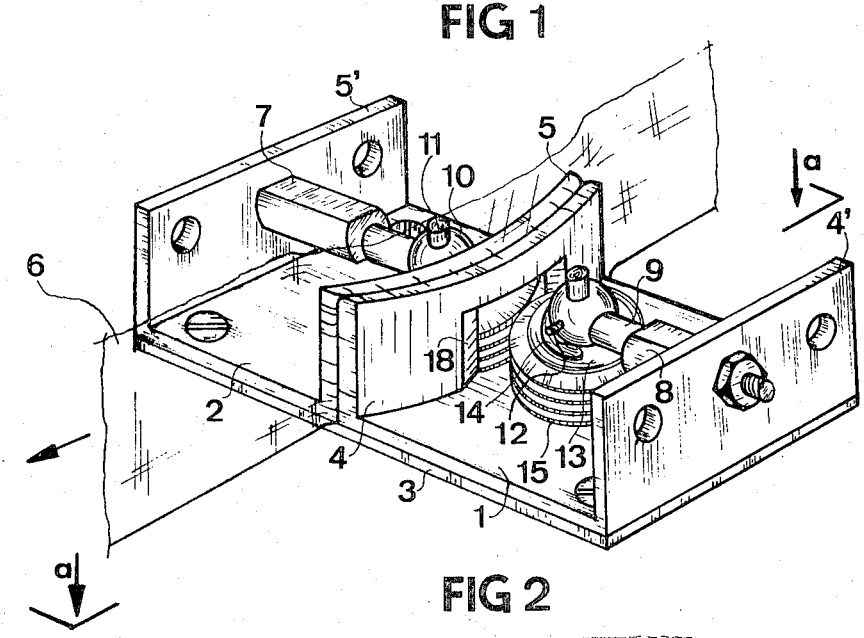
FIG. 1 is a perspective view of a locating device according to the invention.
Figure 2:
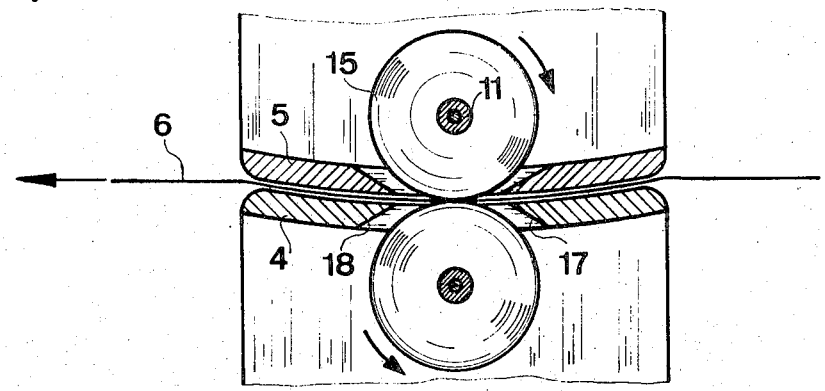
FIG. 2 is a section along line "a—a" of the device shown in FIG. 1.

The locating device shown by way of example in FIGS. 1 and 2 consists of two plates 1 and 2, in the shape of a U, joined together by a plate 3, so that the opposing flanges 4 and 5 of these plates are parallel with each other and are separated by a distance at least equal to the maximal thickness of the film 6 to be located. The opposing surfaces of flanges 4 and 5 are curved and consist, in the example illustrated, of portions of cylindrical surfaces having their axes perpendicular to plate 3. In the example described, the films to be located are made of a polyethylene-type material, a few tens of microns in thickness; experience has shown that the radius of curvature providing perfect locating for this kind of film, with no risk of a fold where the film comes into contact with plate 3, is of the order of about 10 centimetres, whereas the distance between flanges 4 and 5 is of the order of a few tenths of a millmetre.

No detailed description of the other elements of the device will be given, since they have already been described in the above-mentioned U.S. patent, for instance: the roller support 7, pressure screw 8 holding arm 9, protuberance 10 accommodating roller axis 11 secured by means of a set-screw 12, and flexible conical washers 15 mounted between rigid conical rings 13 axially stabilized by clips 14. It should be noted that the axis of rotation of each roller is at an angle to the perpendicular to plate 3, so that flexible washers 15 rotate in planes at an angle to the plate. These planes of rotation converge slightly towards plate 3, in relation to the direction of travel of the film, so that the washers 15 tend to cause the film to bear on the part of plate 3 located between curved guide flanges 4 and 5.

Moreover, it should be noted that flexible washers 15 make contact with the film through windows, such as 16, in each flange 4 and 5. In order to keep these windows as narrow as possible, for the purpose of improving the guidance of the film without interfering with the rotation of the rollers, side edges 17 and 18 of the windows may be bevelled, so that each window widens out from the surface facing the other flange to the opposite surface.

Figure 3:
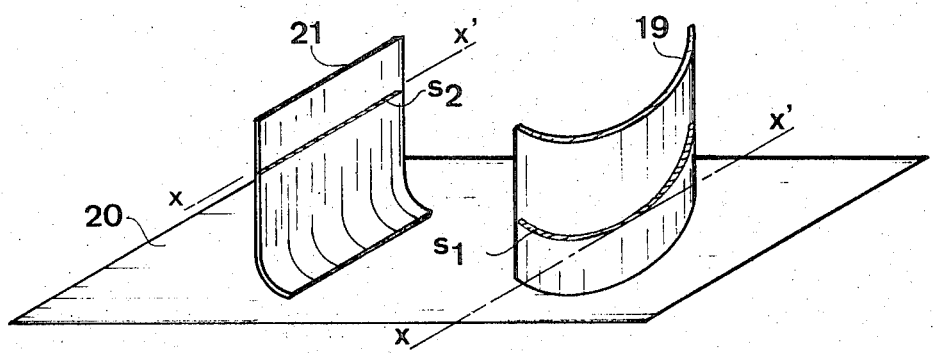
FIG. 3 is a diagram to assist in understanding the present invention.

FIG. 3 is a diagram showing how a curved film, as shown at 19, has a tendency to fold where it rests on a surface 20, substantially lower than that of a flat film 21. This may be perceived intuitively by observing FIG. 3, and it may be explained by the fact that, for a given thickness and modulus of elasticity, the moment of inertia of a curved section $S_1$, in relation to an axis X X', is considerably greater than that of a straight section $S_2$ (which is negligible in a very thin material): thus, under a given stress, curved film 19 bends considerably less than does a flat film 21.

What I claim is:

1. A device for locating at least one edge of a flexible film of specific thickness within a range of thicknesses under consideration, said film being required to travel continuously, under the action of drive means, for the purpose of being subjected to a specific operation, said device comprising, for each edge of the film to be located:

two adjacent guide elements consisting of two guiding surfaces facing each other, between which the edge of said film is required to travel;

stop means provided with a locating area, parallel with the direction of travel of the film, on which the edge of said film, guided by the said surfaces, is adapted to bear and slide;

at least one pair of rollers, arranged symmetrically on each side of the guide elements and provided with flexible skirts between which the edge of the film is adapted to be resiliently gripped, the plane of rotation of said rollers being at a slight angle to said locating area, so that the skirts of said rollers apply to the film, as it passes, forces directed towards said locating area and tending to apply the edge of the film against said area, said two opposing guiding surfaces being curved, parallel with each other, and spaced apart by a distance at least equal to the maximal thickness of film in the range under consideration, the lines of maximal curvature of these surfaces being located in planes parallel with the locating area.

2. A locating device according to claim 1, wherein said guiding surfaces consist of portions of cylindrical surfaces with their axes perpendicular to said locating area.

3. A locating device according to claim 2, wherein said guide elements are equipped with windows through which the flexible skirts of the rollers make contact with the film, the window in each guide element having bevelled lateral edges widening out from the surface facing the other element to the opposite surface.

4. A locating device according to claim 2, adapted to locate the edges of a thin film, of a thickness of the order of a few tens of microns and made of a polyethylene-type material having a high modulus of elasticity, the radius of curvature of the cylindrical guiding surfaces being of the order of about ten centimetres.

* * * * *